United States Patent [19]

Swarz

[11] 4,443,884
[45] Apr. 17, 1984

[54] DATA LINE INTERFACE

[75] Inventor: Richard L. Swarz, Encino, Calif.

[73] Assignee: Protocol Computers, Inc., Woodland Hills, Calif.

[21] Appl. No.: 359,576

[22] Filed: Mar. 18, 1982

[51] Int. Cl.³ .............................................. H04L 5/14
[52] U.S. Cl. ..................................... 375/121; 370/85; 179/2 DP; 179/2 C
[58] Field of Search ..................... 375/36, 121; 370/85, 370/91, 24; 179/2 R, 2 C, 2 DP; 333/24 R

[56] References Cited

U.S. PATENT DOCUMENTS

| 3,691,295 | 9/1972 | Fisk | 375/36 |
| 4,277,646 | 7/1981 | Sams | 179/2 DP |
| 4,317,205 | 2/1982 | Lam | 179/2 C |
| 4,367,374 | 1/1983 | Serrano | 179/2 C |

OTHER PUBLICATIONS

ATT Engineering Director "Data Access Arrangement CDT for Manual Originating and Answering Terminals" Bell System Data Communication, Jul. 1970.

Primary Examiner—Robert L. Griffin
Assistant Examiner—Stephen Chin
Attorney, Agent, or Firm—Blakely, Sokoloff, Taylor & Zafman

[57] ABSTRACT

A data line interface for coupling an RS-232 line to a coaxial cable line, and for coupling a coaxial cable line to an RS-232 line is disclosed. The interface is responsive on the RS-232 side to a request to send (RTS) signal and a data signal (TXD) to couple the data signal to the coax line. Data signals received on the coax line provide a data signal (RCD) and carrier detect outputs on the RS-232 side of the interface. The interface is capable of asynchronous full duplex communication at 9600 baud or greater, and capable of effectively coupling two RS-232 compatible devices together in a manner which is transparent to the devices.

7 Claims, 3 Drawing Figures

DATA LINE INTERFACE

BACKGROUND OF THE INVENTION

1. Field of the Invention.

The present invention relates to the field of data communication interfaces.

2. Prior Art.

Data devices in a typical data processing system generally communicate with other devices in the system through the use of one or more standard data device interconnection schemes or protocols. By way of specific example, many devices in typical minicomputer and microcomputer systems, such as terminals, printers and the like, are interconnected and/or connected to the CPU using a standard RS-232 line. An RS-232 port is an EIA standard serial data port, with a serial data line plus additional control and/or status lines.

In addition to RS-232 lines, other types of communication lines are also frequently used, including parallel lines and coaxial cable (coax) lines, the latter being of particular interest to the present invention. As the name implies, a coax line is truly a single data line (with return) without provision for any additional status or control lines. Such lines have certain advantages in that they are relatively low cost and easily installed. However, their use is limited to those situations where the communications protocol allows or is compatible with the single line nature of a coax cable. Such lines are frequently found in installations having a number of remote terminals connected to a central main frame computer, such as an IBM computer. In certain situations however, it would be desirable to be able to provide a standard RS-232 plug and interface at each end of a line, but use a coax cable rather than the multiline cable of the RS-232 standard, so that the coax in existing installations could be used for RS-232 communication, and/or coax cable could be run in new installations if desired to reduce the cost of cable installation.

BRIEF SUMMARY OF THE INVENTION

A data line interface for coupling an RS-232 line to a coaxial cable line, and for coupling a coaxial cable line to an RS-232 line is disclosed. The interface is responsive on the RS-232 side to a request to send (RTS) signal and a data signal (TXD) to couple the data signal to the coax line. Data signals received on the coax line provide a data signal (RCD) and carrier detect outputs on the RS-232 side of the interface. The interface is capable of asynchronous full duplex communication at 9600 baud or greater, and capable of effectively coupling two RS-232 compatible devices together in a manner which is transparent to the devices.

DETAILED DESCRIPTION OF THE INVENTION

Figure 1:
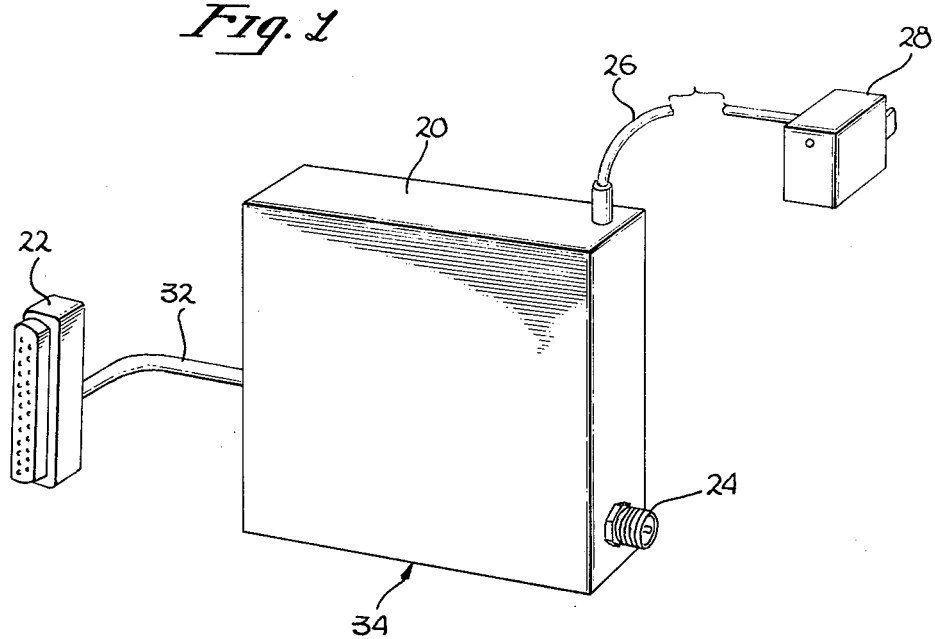
FIG. 1 is a view of a packaged interface in accordance with the present invention.

First referring to FIG. 1, a typical embodiment of the present invention may be seen. This embodiment is characterized by an enclosure 20 having a standard RS-232 connector 22 on a relatively short cable 32 and a coax connector 24 at the other end. The circuit within the enclosure 20 is provided with power through line 26, preferably through a step-down transformer power supply 28, pluggable into standard 110 volt outlets. In the preferred embodiment, power supply 28 is a 24 volt DC power supply for providing power to the circuit within the enclosure.

Figure 2:
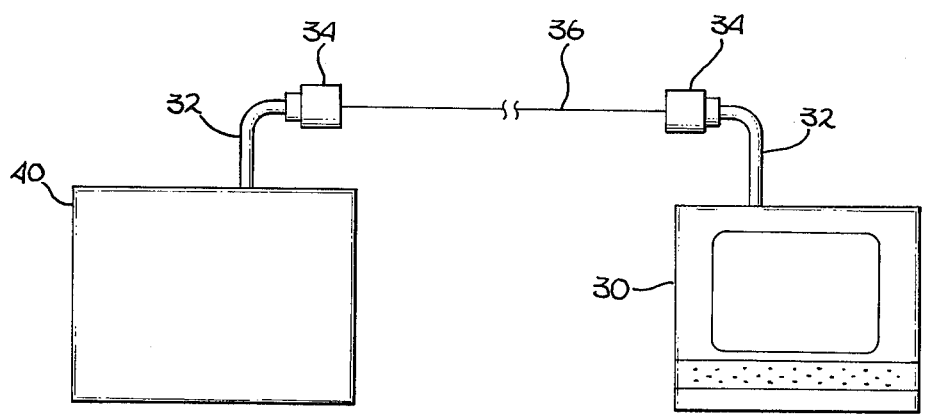
FIG. 2 is a block diagram illustrating the use of the present invention for the connection of two RS-232 compatible data devices through a coax line.

The interface of FIG. 1 is a bilateral interface and can be used at either end of a coax line, and typically at both ends to effectively couple two RS-232 devices. This is illustrated in FIG. 2, which is exemplary of a typical connection using the present invention. Here, a terminal 30 having a conventional RS-232 port is coupled through the short cable 32 to one of the interfaces of the present invention, generally indicated by the numeral 34, which in turn is connected to a coax line 36, typically of some substantial length, dependent on the distance between devices in the installation. At the other end of the line would be another interface 34 coupled again through an RS-232 line to a remote computer or other device 40. The interfaces 34 of the present invention, as shall subsequently be seen from the detailed description of the circuit thereof, are capable of full duplex operation, typically of speeds up to 9600 baud or higher and in an asynchronous manner at data rates determined by the digital devices on the line and not by the interfaces themselves. Thus the presence of the two interfaces 34 and the coax cable 36 is totally transparent to the two RS-232 compatible devices, with the devices operating as if they were directly connected together on an RS-232 line.

Figure 3:
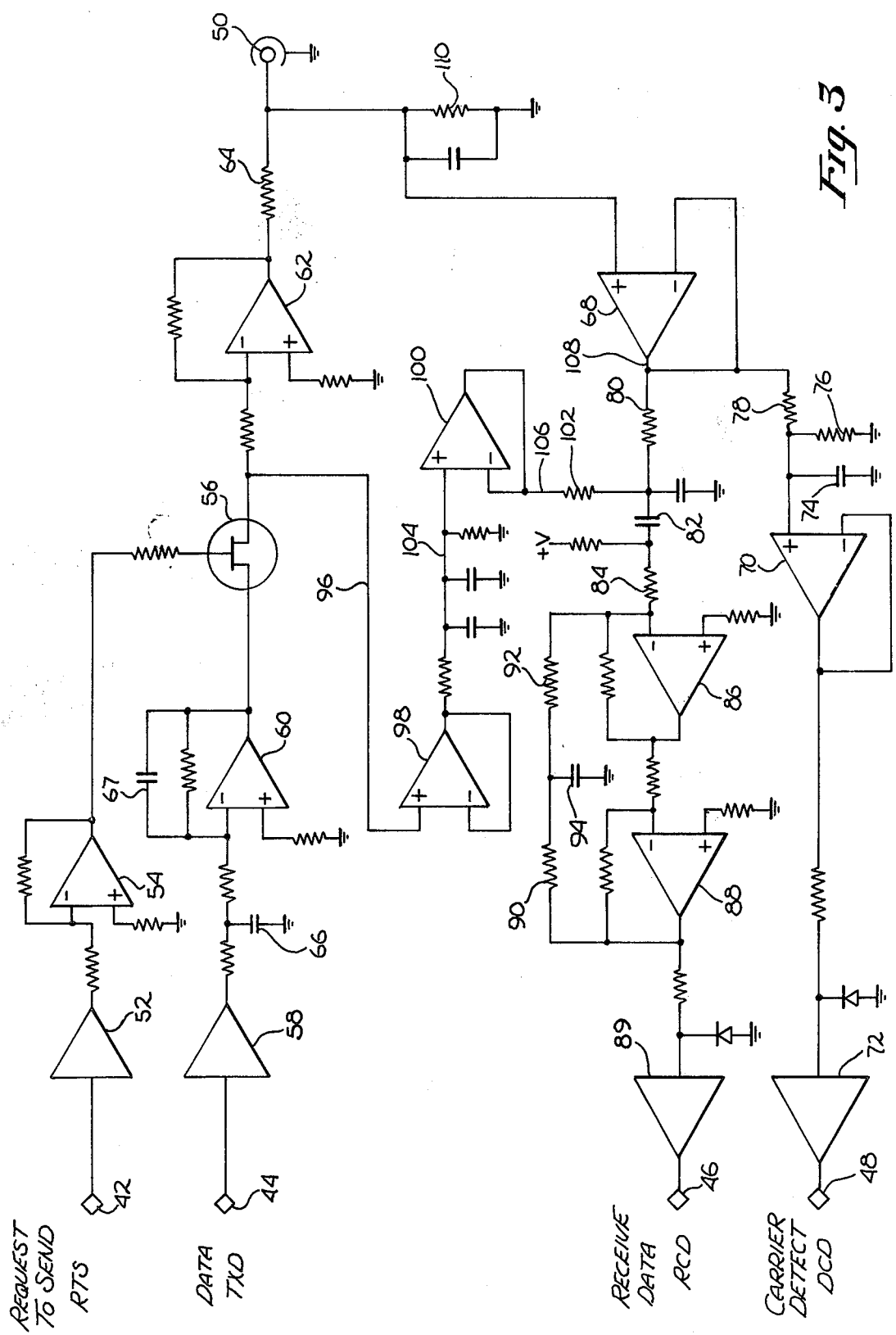
FIG. 3 is a detailed circuit diagram of the preferred embodiment of the present invention.

Now referring to FIG. 3, a detailed circuit diagram of the interface of FIGS. 1 and 2 may be seen. On the RS-232 side of the circuit, four connections are provided, specifically a request to send (RTS) signal on pin 42, a transmit data signal (TXD) on pin 44, a receive data signal (RCD) on pin 46 and a carrier detect signal (DCD) on pin 48. On the coax cable side of the circuit, of course, only a signal connection 50 (and return through the coax shield) are provided.

For transmitting a data signal, an RTS signal is provided on pin 42 which, on buffering through amplifiers 52 and 54, is provided to the gate of a field effect device 56, turning that device on. At the same time, base band digital data TXD is provided on pin 44 which, on buffering (and inversion) by amplifiers 58 and 60, is coupled through field effect device 56 to amplifier 62, reinverting the signal and driving the coax line through resistor 64 and pin 50. Capacitors 66 and 67 provide only a slight amount of filtering, specifically to remove the higher frequency components from the base band data signal being transmitted so as to reduce the noise in the signal without significantly affecting the shape of the base band data signal.

For reception, neglecting for the moment the effect of a simultaneous transmission, i.e., full duplex operation, the signal on the coax line is received through pin 50 and buffered through amplifier 68. The output of amplifier 68 is coupled through amplifier 70 and carrier detect output amplifier 72 to provide a carrier detect signal on pin 48. The carrier detect signal will be high whenever a high state signal is received from the coax line, or a data stream is received containing more than a diminimous number of high states. In that regard, capacitor 74, in combination with resistors 76 and 78, provides filtering of the receive data signal so that the carrier detect signal output on pin 48 will remain high, not only when a high state signal is being received, but also when a data stream is being received, rather than being triggered on and off by the data stream at the data rate.

The output of amplifier 68 is also coupled through resistor 80, capacitor 82 and resistor 84 first to amplifier 86, then to amplifier 88 and finally to amplifier 89 to provide the RCD output signal. Both amplifiers 86 and 88 are connected with negative feedback in the normal manner, with the combination of amplifiers 86 and 88 having some additional feedback around both amplifiers through resistors 90 and 92, as suppressed on the high frequency end by capacitor 94. The feedback through resistors 90 and 92 acts as a slight positive feedback for wave shapping purposes.

The foregoing analysis of the circuit of FIG. 3 neglected the coupling between the data transmission circuit (TXD) and the data reception circuit (RCD), and particularly the coupling between these two circuits when operating in a full duplex mode. When the circuit is receiving only, i.e., receiving a signal from the coax line through pin 50, field effect device 56 will be off. As a result, the only drive for line 96 will be the feedback resistor for amplifier 62, which will feed back a signal to drive the differential input of that amplifier to zero. Since the noninverting input of the amplifier is effectively coupled to ground, line 96, as well as the amplifier 62, will both effectively be at ground. Similarly, the outputs of amplifiers 98 and 100 will also effectively be at ground. Accordingly, the only signal into amplifier 86 in the receive data (RCD) circuit will be the incoming signal through pin 50 and amplifier 68 (as divided down by resistor 80 and resistor 102).

If, on the other hand, one is operating in the other half duplex mode, i.e., transmitting only and not receiving, the RTS signal will be high, turning on field effect device 56, with the data stream being coupled therethrough as a result of data being applied to pin 44 of the RS-232 plug. Obviously, in this case, the data stream is being coupled to the coax line 50 as hereinbefore described. At the same time however, the inverted data stream will also appear on lines 96, 104 and 106. Consequently, summing resistors 80 and 102 form a summing junction to sum a signal proportional to TXD on line 108 and a signal proportional to the inverse of TXD on line 106.

By appropriate selection of the scaling, the component of the signal TXD on line 108 and of the inverse thereof on line 106 may be cancelled at the summing junction, so that the transmission of a TXD signal by the circuit of FIG. 3 does not provide a mirror thereof as an apparent receive data signal (RCD). In that regard, the transmitted data signal TXD on pin 50 is equal to the output of amplifier 62 divided down by the combination of resistors 64 and 110, further loaded by (i), resistors equivalent to resistors 64 and 110 in the interface at the other end of the coax line and (ii), the impedance of the coax line. In general, the coax line would be expected to have capacitive component as opposed to an inductive component, though in either case there will be some phase shift between the inverted TXD signal on line 96 and the TXD signal on pin 50. However, a corresponding phase shift may be introduced by way of capacitive loading, such as capacitive loading of line 104 if the coax has the expected capacitive component. Accordingly, for any given coax cable, the transmitted data signal (TXD) may be substantially eliminated from the apparent receive data signal (RCD) in the circuit of FIG. 3. The TXD signal, as transmitted to the coax cable through pin 50, is not eliminated however, from the carrier detect signal (DCD) on pin 48 and accordingly, the carrier detect signal provides an indication of data being received or transmitted.

It has been shown that in the half duplex mode of receiving data from the coax line, the receive data appears as the RS-232 connector output signal RCD. It has also been shown that in the transmitting half duplex mode, the transmitted data signal TXD applied to the RS-232 connector is coupled to the coax line through pin 50 without being simultaneously coupled to the receive data line RCD of the RS-232 connector. Thus, since the receive data signal RCD (i), is responsive to the signal received from the coax line through pin 50 and (ii), is not sensitive to the transmit data signal TXD as coupled to the coax line, the circuit of FIG. 3 may readily operate in a full duplex mode, i.e., simultaneously transmitting data to and receiving data from the coax line. Further, it is obvious from the circuit of FIG. 3 that there is nothing inherent in the circuit that sets data rates, but rather the data rate for the transmitted signal is determined by the data equipment that may be connected to the RS-232 connector of the interface of FIG. 3, and the receive data rate will be as set by the digital device coupled to the other end of the coax line through a corresponding interface.

There has been described herein a new and unique interface which allows the coupling of RS-232 compatible equipment in a data system through a coax cable in a manner which makes the presence of the coax cable substantially transparent to the data equipment. Such coupling has a number of advantages in that it allows the use of coax in relatively long cable runs, rather than the more expensive RS-232 compatible cable, and of course, avoids the cost of cable replacement entirely when one desires to use RS-232 compatible equipment in installations previously cabled with coax. Obviously, while the present invention has been described with respect to the connection of RS-232 compatible equipment through coax cable, the present invention may also be used with data equipment having other protocols if such equipment is coupled to one end of the coax line through a different interface converting such other protocol to coax signals compatible with the present invention or, as is more likely, by coupling an additional interface to the equipment of another protocol to convert that protocol to RS-232 so that the present invention may be used on both ends of the coax. Further, of course, while the present invention has been disclosed and described with respect to a preferred embodiment thereof, it will be obvious to those skilled in the art that various changes in form and detail may be made therein without departing from the spirit and scope of the invention.

I claim:

1. An interface comprising
   first means for coupling to a coaxial cable,
   second means for coupling to an RS-232 data line to receive data coupled to said second means for transmission on a coaxial cable,
   third means for coupling to an RS-232 request to send line,
   fourth means coupled to said first means for coupling data received from a coaxial cable to an RS-232 receive data line, said third means being responsive to a signal on an RS-232 request to send line to couple said second means to said first means, whereby data received on an RS-232 data line will be coupled to a coaxial cable in response thereto, said interface further having signal means coupled to said fourth means, and responsive to a data signal received by said second means and coupled to said first means, said signal means being a means for providing a signal to said fourth means to prevent the data signal coupled from said second means to said first means for transmission on a coaxial cable from being coupled to said RS-232 receive data line, whereby said fourth means will couple data received from a coaxial cable to an RS-232 data line independent of the simultaneous transmission of data to a coaxial cable by said interface.

2. The interface of claim 1 further comprised of fifth means for providing an RS-232 carrier detect signal responsive to data being coupled to or received from a coaxial cable by said first means.

3. An RS-232 to coaxial cable interface comprising first means having request to send, transmit data and receive data terminals for coupling to RS-232 request to send, transmit data and receive data lines respectively, second means for coupling signals to and from a coaxial cable, said first means having means responsive to a signal on said request to send terminal to couple said transmit data terminal to said second means, said first means further having means coupling said second means to said receive data terminal to present data received from a coaxial cable coupled to said second means, said interface further comprising signal cancellation means responsive to a signal on said transmit data terminal as coupled to said second means by a signal on said request to send terminal to cancel components of the signal on the transmit data terminal from the signal on the receive data terminal.

4. The interface of claim 3 further comprised of a carrier detect means for providing an RS-232 carrier detect signal responsive to the presence of data signals on a said second means.

5. The interface of claim 3 wherein said second means is a means for coupling signals to and from a coaxial cable through an impedance and wherein said signal cancellation means is responsive to a signal on said transmit data terminal as coupled to said impedance of said second means.

6. The interface of claim 5 wherein said impedance is substantially resistive.

7. The interface of claim 5 further comprised of phase shift means to compensate for phase shifts between the signal coupled through said impedance and the signal coupled to a coaxial line.

* * * * *

UNITED STATES PATENT AND TRADEMARK OFFICE
CERTIFICATE OF CORRECTION

PATENT NO. : 4,443,884

DATED : Apr. 17, 1984

INVENTOR(S) : Swarz

It is certified that error appears in the above-identified patent and that said Letters Patent is hereby corrected as shown below:

| COLUMN | LINE | DESCRIPTION |
|---|---|---|
| 5 | 16 | Please insert --receive-- between the words "RS-232" and "data line" |

Signed and Sealed this

Fifteenth Day of July 1986

[SEAL]

Attest:

Attesting Officer

DONALD J. QUIGG

Commissioner of Patents and Trademarks